July 19, 1949.　　　W. GINGRICH　　　2,476,594
AIRPLANE PARKING DEVICE
Filed Aug. 3, 1948　　　2 Sheets-Sheet 2
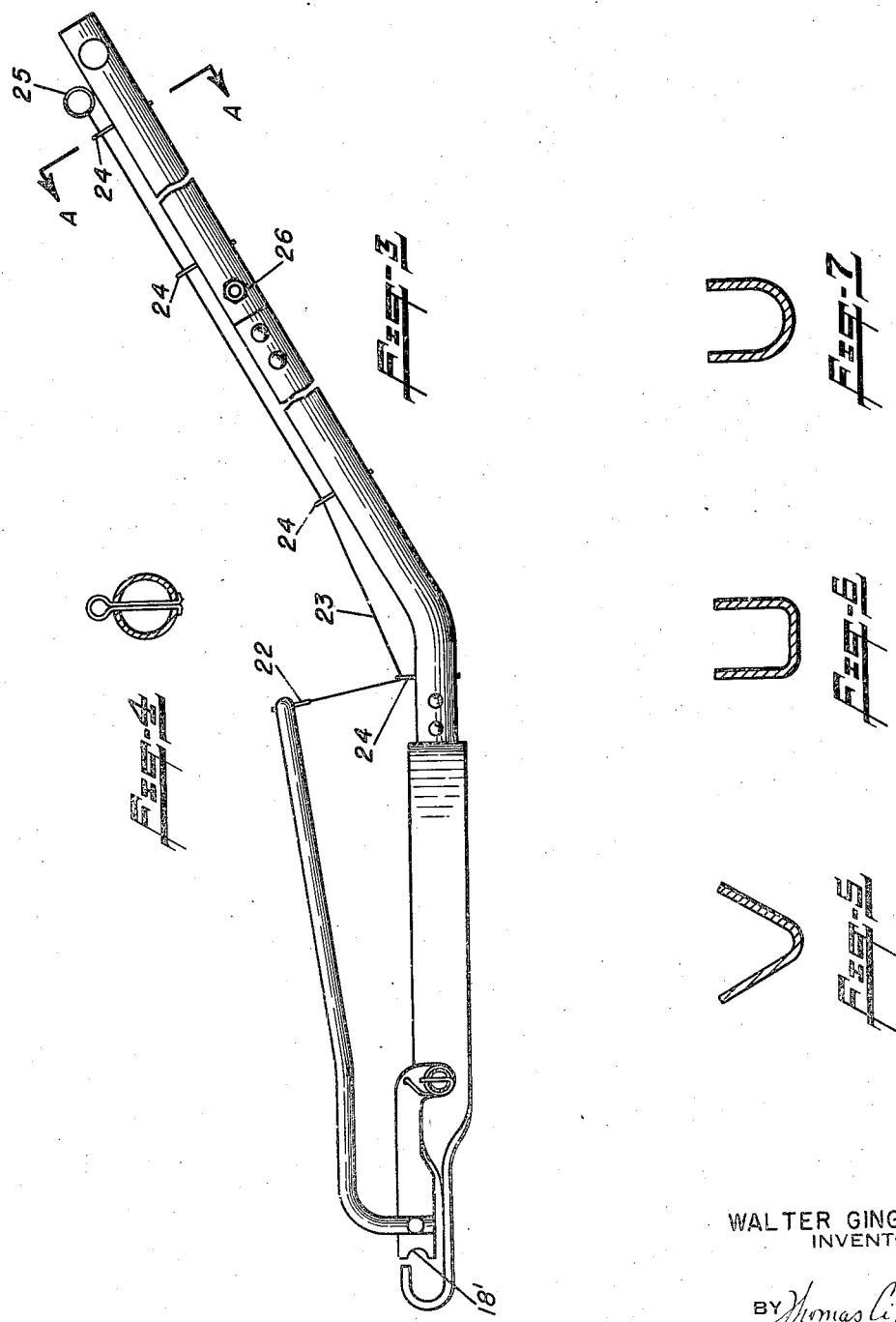
WALTER GINGRICH
INVENTOR
BY Thomas Cifolli Jr.
ATTORNEY Patented July 19, 1949

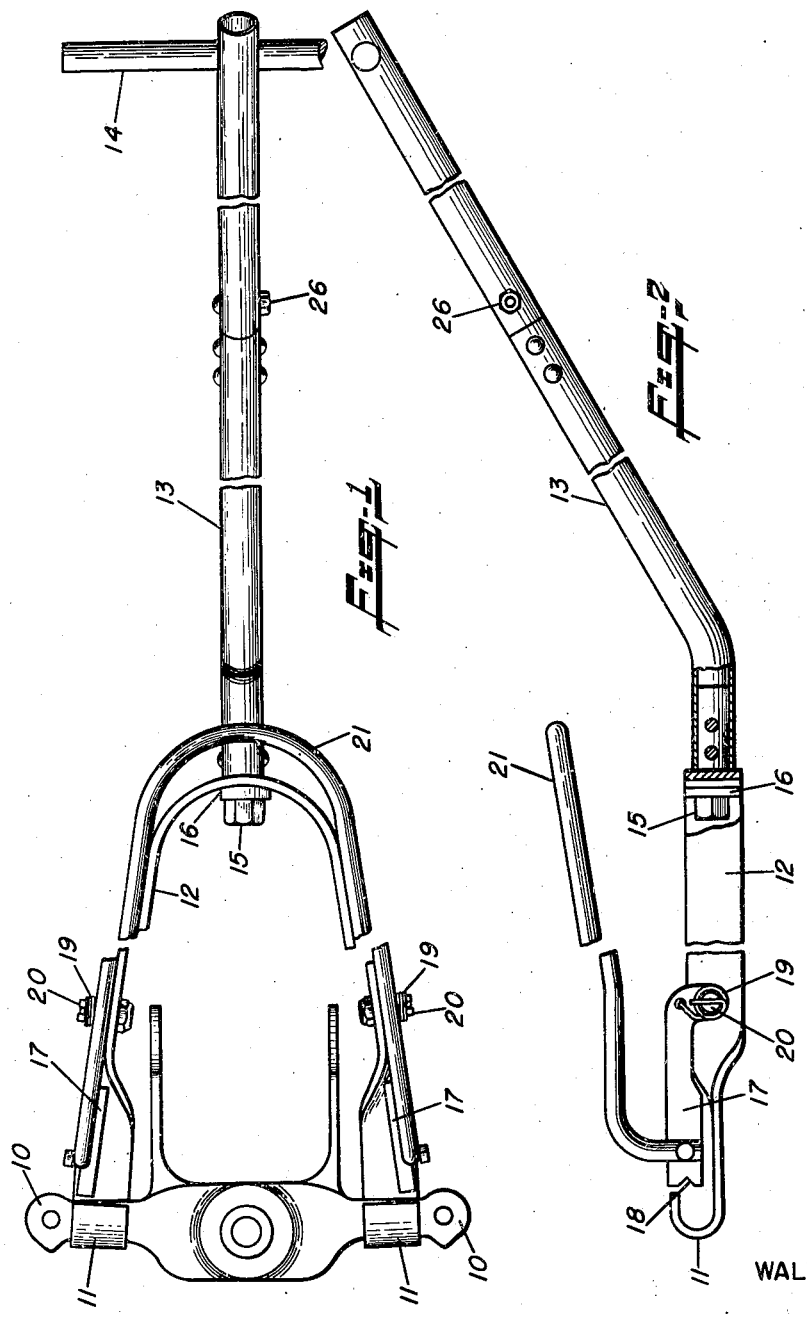

2,476,594

UNITED STATES PATENT OFFICE 2,476,594

AIRPLANE PARKING DEVICE

Walter Gingrich, North Brunswick, N. J., assignor to Aeromotive Corporation, New Brunswick, N. J., a corporation of New Jersey Application August 3, 1948, Serial No. 42,211

12 Claims. (Cl. 280—47)

This invention relates to a novel airplane parking device, and more especially to a device which will enable one person to park or move lightweight airplanes on the ground without employing the airplane engine or engines or other motive power.

An object of my present invention is to provide a light-weight device which is novel in construction and which can be easily engaged with and disengaged from the wheel forks of the wheel assembly of an airplane.

A further object of this invention is to provide a device which will enable one person conveniently to maneuver a plane on the ground, either by pushing or pulling said airplane.

A still further object of my invention is to provide novel spring means to engage and hold the wheel forks of the wheel assembly of an airplane.

Other objects and advantages of this invention will become apparent from the following detailed description, taken in conjunction with the accompanying drawings which form a part hereof and in which like characters designate like parts throughout.

In the drawings:

Fig. 1 is a broken plan view of a preferred embodiment of my airplane parking device showing it in locked position around the wheel forks of a wheel assembly of an airplane;

Fig. 2 is a side elevation of the device shown in Fig. 1, the wheel forks of the wheel assembly of an airplane being omitted and part of the device being in longitudinal section so as to expose it to view;

Fig. 3 is similar to Fig. 2 and shows another preferred embodiment of my novel airplane parking device, the device of Fig. 3 having hand-operable tripping means for locking my device around the wheel forks of a wheel assembly of an airplane and also having a modified locking arm face or side;

Fig. 4 is a cross-section of Fig. 3, taken along the line A—A of Fig. 3; and

Figs. 5, 6 and 7 show cross-sections of modified upper portions of my device.

Referring to the drawings, 10 is an arm of the wheel forks of the wheel assembly of an airplane, the wheel itself not being shown. Extending partly around each arm 10 is a rigid clamp 11, each clamp forming the open end of a U-shaped or bifurcated element 12 which in turn is rigidly attached to the upper portion of my device, consisting of stem 13 and handle 14, by means of bolt 15 and a special conformed washer 16.

Pivotally mounted near each clamp 11 is a locking arm 17 having a V-shaped face 18 (Figs. 1 and 2) or a circular face 18' (Fig. 3). One end of a spring 19 is attached to the locking arm 17 near its point of pivot. The other end of the spring is coiled around and secured to a lug or projection 20 which itself is secured to the U-shaped element 12. The spring is constructed so that it is strong enough to keep locking arms 17 in closed or operating position normally, i. e., when the hereinafter described tripping unit is not being operated.

Rigidly attached to the fore part of each locking arm 17 is foot tripper 21. An alternative tripping unit is shown in Fig. 3, in which the tripper 21 carries a hook-like element 22 through which wire 23 passes, the wire being also passed through loops 24 and terminating in ring 25. The loops 24 are cotter-pin-like elements and their entire construction is more clearly shown in Fig. 4.

If desired, the wire 23 may be contained within the upper portion or stem of my device and in such case this portion may be open and channel-like, as shown by the cross-sectional figures, Figs. 5, 6 and 7.

It will be understood that my device may be constructed entirely of metal, steel and aluminum being advantageous. If desired, the handle 14 may be of wood instead of metal. Since the overall length of my device is approximately 5 feet, it is obvious that one person can easily hold and manipulate the novel device. For ease in assembling and carrying my device it can be provided in sections which may be bolted together when the device is not needed. Bolts 26 are suitable for holding the sections together. To accommodate varying requirements as to size in order to be operably easily in connection with different airplanes and by different persons, my device may contain telescoping sections if desired.

In operation, my parking device is assembled as shown in Figs. 1, 2 and 3 and brought in proximity to an airplane which is to be parked in a hanger or moved on the ground. If desired, the pilot of an airplane may carry his own device with him in flight, in unassembled condition, and then assemble it when needed. By tapping tripper 21 with a foot (or if the device of Fig. 3 is employed, then by pulling ring 25 upwards) locking arms 17 are pivotally moved so as to raise their locking faces 18 or 18'. By a simple manipulation clamps 11 are caused to engage with the wheel forks 10 of the wheel assembly of the airplane and the tripper 21 is released, the springs 19 causing locking arms 17 to lower, thereby effecting a locking action around the wheel forks 10. It is then a matter of pushing or pulling the airplane into the desired position, the construction of the faces 18 or 18' being of material help in this regard.

As will be appreciated by those skilled in the art of airplane parking, my novel device has obvious advantages. The unique gripping action afforded by clamps 11 and locking arms 17, working together, renders it comparatively easy for one person to maneuver an airplane around on the ground. As will also be understood by those familiar with the problem of parking airplanes, my novel device is superior to those which depend for their gripping action on engagement with the axle of an airplane as such latter devices are subject to the criticism that most are limited to certain size axles and unless specifically designed for a particular axle such devices do not satisfactorily serve for their intended purposes.

While this invention has been described in detail various modifications may be made in it and it is understood that all such modifications that do not depart from the spirit of this invention are intended to be secured herein if they come within the scope of the appended claims.

I claim:

1. A parking device suitable for engaging the wheel forks of light-weight airplanes, which comprises a handle portion, a bifurcated portion rigidly attached to said handle portion, said bifurcated portion having arcuate terminal edges, locking arms pivotally mounted on said bifurcated portion near said edges, said arms having a V-shaped gripping face, spring means adapted to retain said locking arms normally in closed position, in which position said edges and said faces are in sufficiently close proximity to each other that said wheel forks cannot pass through the space between said edges and said faces, and a bifurcated tripping element rigidly attached to said locking arms between the points of pivot of said arms and said faces of said locking arms so as to enable the latter to assume an open position, said tripping element having a flexible wire movably attached to said handle portion, the upper end of said wire being near the upper end of said handle portion, said handle portion consisting of a plurality of sections.

2. A parking device suitable for engaging the wheel forks of light-weight airplanes, which comprises a handle portion, a bifurcated portion rigidly attached to said handle portion, said bifurcated portion having arcuate terminal edges, locking arms pivotally mounted on said bifurcated portion near said edges, said arms having a V-shaped gripping face, spring means adapted to retain said locking arms normally in closed position, in which position said edges and said faces are in sufficiently close proximity to each other that said wheel forks cannot pass through the space between said edges and said faces, and a bifurcated tripping element rigidly attached to said locking arms between the points of pivot of said arms and said faces of said locking arms so as to enable the latter to assume an open position, said handle portion consisting of a plurality of sections.

3. A parking device suitable for engaging the wheel forks of light-weight airplanes, which comprises a handle portion, a bifurcated portion rigidly attached to said handle portion, said bifurcated portion having arcuate terminal edges, locking arms pivotally mounted on said bifurcated portion near said edges, said arms having faces with indentations therein, spring means adapted to retain said locking means normally in closed position, in which position said edges and said faces are in sufficiently close proximity to each other that said wheel forks cannot pass through the space between said edges and said faces, and a bifurcated tripping element rigidly secured to said locking arms between the points of pivot of said arms and said faces of said locking arms so as to enable the latter to assume an open position, said tripping element having a flexible wire movably attached to said handle portion, the upper end of said wire being near the upper end of said handle portion, said handle portion consisting of a plurality of sections.

4. A parking device suitable for engaging the wheel forks of light-weight airplanes, which comprises a handle portion, a bifurcated portion rigidly attached to said handle portion, said bifurcated portion having arcuate terminal edges, locking arms pivotally mounted on said bifurcated portion near said edges, said arms having faces with indentations therein, spring means adapted to retain said locking means normally in closed position, in which position said edges and said faces are in sufficiently close proximity to each other that said wheel forks cannot pass through the space between said edges and said faces, and a bifurcated tripping element rigidly secured to said locking arms between the points of pivot of said arms and said faces of said locking arms so as to enable the latter to assume an open position, said handle portion consisting of a plurality of sections.

5. A parking device suitable for engaging the wheel forks of light-weight airplanes, which comprises a handle portion, a bifurcated portion rigidly attached to said handle portion, said bifurcated portion having arcuate terminal edges, locking arms pivotally mounted on said bifurcated portion near said edges, said arms having a V-shaped gripping face, spring means adapted to retain said locking arms normally in closed position, in which position said edges and said faces are in sufficiently close proximity to each other that said wheel forks cannot pass through the space between said edges and said faces, and a tripping element rigidly attached to said locking arms between the points of pivot of said arms and said faces of said locking arms so as to enable the latter to assume an open position, said handle portion consisting of a plurality of sections.

6. A parking device suitable for engaging the wheel forks of light-weight airplanes, which comprises a handle portion, a bifurcated portion rigidly attached to said handle portion, said bifurcated portion having arcuate terminal edges, locking arms pivotally mounted on said bifurcated portion near said edges, said arms having faces with indentations therein, spring means adapted to retain said locking arms normally in closed position, in which position said edges and said faces are in sufficiently close proximity to each other that said wheel forks cannot pass through the space between said edges and said faces, and a tripping element rigidly attached to said locking arms between the points of pivot of said arms and said faces of said locking arms so as to enable the latter to assume an open position, said handle portion consisting of a plurality of sections.

7. A parking device suitable for engaging the wheel forks of light-weight airplanes, which comprises a handle portion, a bifurcated portion rigidly attached to said handle portion, said bifurcated portion having arcuate terminal edges, locking arms pivotally mounted on said bifurcated portion near said edges, said arms having a V-shaped gripping face, spring means adapted to retain said locking arms normally in closed position, in which position said edges and said faces are in sufficiently close proximity to each other that said wheel forks cannot pass through the space between said edges and said faces, and a bifurcated tripping element rigidly attached to said locking arms between the points of pivot of said arms and said faces of said locking arms so as to enable the latter to assume an open position, said tripping element having a flexible wire movably attached to said handle portion, the upper end of said wire being near the upper end of said handle portion.

8. A parking device suitable for engaging the wheel forks of light-weight airplanes, which comprises a handle portion, a bifurcated portion rigidly attached to said handle portion, said bifurcated portion having arcuate terminal edges, locking arms pivotally mounted on said bifurcated portion near said edges, said arms having a V-shaped gripping face, spring means adapted to retain said locking arms normally in closed position, in which position said edges and said faces are in sufficiently close proximity to each other that said wheel forks cannot pass through the space between said edges and said faces, and a bifurcated tripping element rigidly attached to said locking arms between the points of pivot of said arms and said faces of said locking arms so as to enable the latter to assume an open position.

9. A parking device suitable for engaging the wheel forks of light-weight airplanes, which comprises a handle portion, a bifurcated portion rigidly attached to said handle portion, said bifurcated portion having arcuate terminal edges, locking arms pivotally mounted on said bifurcated portion near said edges, said arms having faces with indentations therein, spring means adapted to retain said locking means normally in closed position, in which position said edges and said faces are in sufficiently close proximity to each other that said wheel forks cannot pass through the space between said edges and said faces, and a bifurcated tripping element rigidly secured to said locking arms between the points of pivot of said arms and said faces of said locking arms so as to enable the latter to assume an open position, said tripping element having a flexible wire movably attached to said handle portion, the upper end of said wire being near the upper end of said handle portion.

10. A parking device suitable for engaging the wheel forks of light-weight airplanes, which comprises a handle portion, a bifurcated portion rigidly attached to said handle portion, said bifurcated portion having arcuate terminal edges, locking arms pivotally mounted on said bifurcated portion near said edges, said arms having faces with indentations therein, spring means adapted to retain said locking means normally in closed position, in which position said edges and said faces are in sufficiently close proximity to each other that said wheel forks cannot pass through the space between said edges and said faces, and a bifurcated tripping element rigidly secured to said locking arms between the points of pivot of said arms and said faces of said locking arms so as to enable the latter to assume an open position.

11. A parking device suitable for engaging the wheel forks of light-weight airplanes, which comprises a handle portion, a bifurcated portion rigidly attached to said handle portion, said bifurcated portion having arcuate terminal edges, locking arms pivotally mounted on said bifurcated portion near said edges, said arms having a V-shaped gripping face, spring means adapted to retain said locking arms normally in closed position, in which position said edges and said faces are in sufficiently close proximity to each other that said wheel forks cannot pass through the space between said edges and said faces, and a tripping element rigidly attached to said locking arms between the points of pivot of said arms and said faces of said locking arms so as to enable the latter to assume an open position.

12. A parking device suitable for engaging the wheel forks of light-weight airplanes, which comprises a handle portion, a bifurcated portion rigidly attached to said handle portion, said bifurcated portion having arcuate terminal edges, locking arms pivotally mounted on said bifurcated portion near said edges, said arms having faces with indentations therein, spring means adapted to retain said locking arms normally in closed position, in which position said edges and said faces are in sufficiently close proximity to each other that said wheel forks cannot pass through the space between said edges and said faces, and a tripping element rigidly attached to said locking arms between the points of pivot of said arms and said faces of said locking arms so as to enable the latter to assume an open position.

WALTER GINGRICH.

REFERENCES CITED

The following references are of record in the file of this patent:

UNITED STATES PATENTS

| Number | Name | Date |
| --- | --- | --- |
| 1,754,407 | Stearman | Apr. 15, 1930 |
| 2,348,741 | Jessen | May 16, 1944 |
| 2,391,608 | Wood | Dec. 25, 1945 |
| 2,424,095 | Horton | July 15, 1947 |
| 2,449,680 | Wak et al. | Sept. 21, 1948 |